United States Patent [19]
Klein

[11] 4,035,454
[45] July 12, 1977

[54] MANUFACTURE AND APPLICATION OF ROD WRAPS TO A FISHING ROD

[76] Inventor: Gerald B. Klein, 13451 Stuart Court, Broomfield, Colo. 80020

[21] Appl. No.: 675,822

[22] Filed: Apr. 12, 1976

Related U.S. Application Data

[63] Continuation of Ser. No. 516,034, Oct. 18, 1974, abandoned.

[51] Int. Cl.² ........................................ B29C 27/20
[52] U.S. Cl. .................................... 264/28; 43/24; 264/151; 264/230; 264/342 R
[58] Field of Search ................ 264/28, 342 R, 230; 43/24

[56] References Cited

U.S. PATENT DOCUMENTS

| | | | |
|---|---|---|---|
| 2,296,174 | 9/1942 | Meisler | 43/24 |
| 2,506,069 | 5/1950 | Dalton | 264/28 X |
| 2,577,466 | 12/1951 | Jones | 264/342 R |
| 3,253,618 | 5/1966 | Cook | 264/230 X |
| 3,400,481 | 9/1968 | Christenson | 264/342 R X |
| 3,714,316 | 1/1973 | Angeloff | 264/230 |
| 3,957,382 | 5/1976 | Greuel | 264/230 X |

FOREIGN PATENT DOCUMENTS 1,132,625  11/1968  United Kingdom ................ 43/24

Primary Examiner—Richard R. Kucia

[57] ABSTRACT

Wraps to hold line guides on a fisherman's rod are formed as sleeve-like units by the embedment of a length of wound thread in a clear, elastomeric plastic resin, or by forming a cylindrical sleeve of elastic plastic resins. The sleeve-like wraps are expanded in diameter by an expanding tool and then chilled, or "frozen" to remain in an expanded state after the expanding tool is removed, and while expanded, the wraps are fitted onto a fishing rod and over the feet of line guides on the rod. Thereafter, warming of the frozen wraps to ambient temperatures permits them to contract to their original size to fit tightly upon the rod. A turret type of apparatus including expanders is provided to receive, expand, freeze and permit removal of the expanded wraps from the expanders for production assembly operations. An extrusion type of apparatus is provided to form wraps by winding thread such as nylon upon an inner sleeve of plastic and thereafter, embedding the thread in an outer sleeve of plastic as a continuous operation.

3 Claims, 19 Drawing Figures

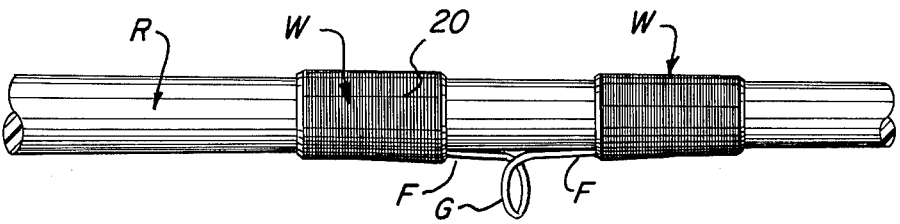
Fig_1
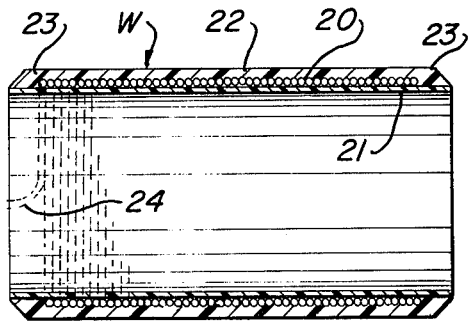
Fig_2
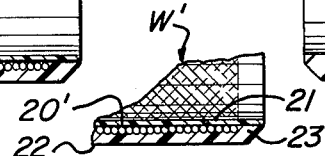
Fig_2a
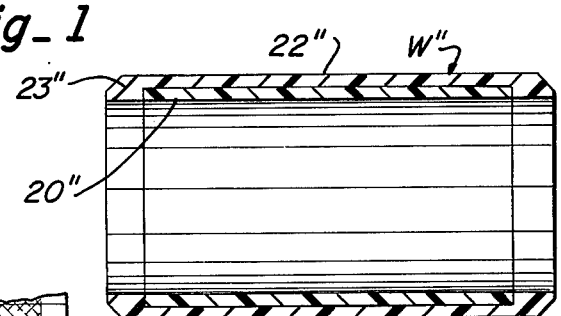
Fig_3
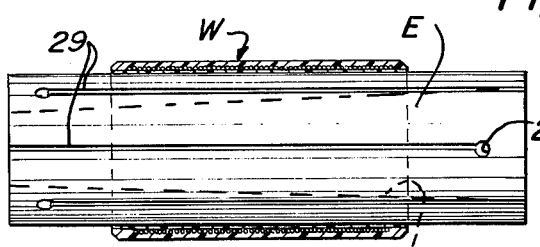
Fig_4
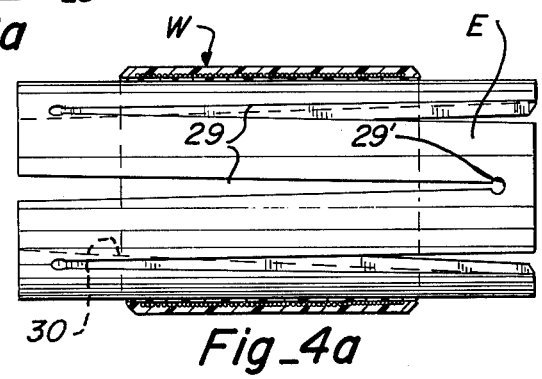
Fig_4a
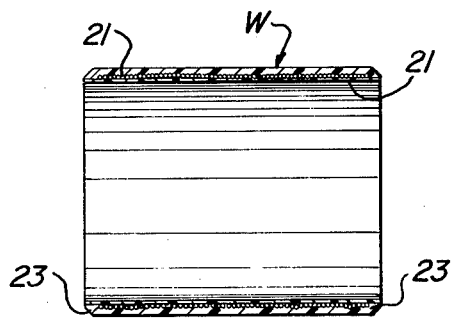
Fig_4b
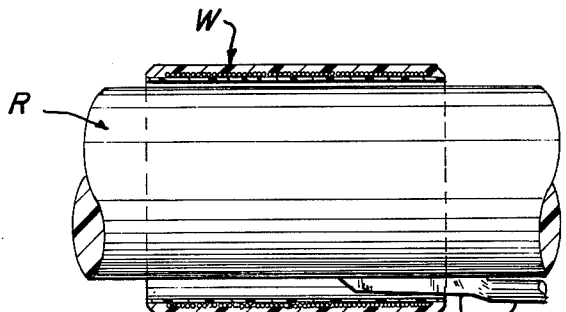
Fig_4c
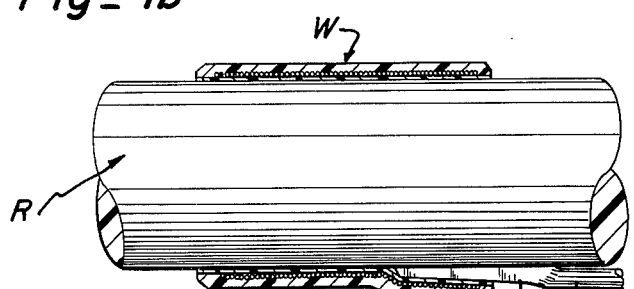
Fig_4d
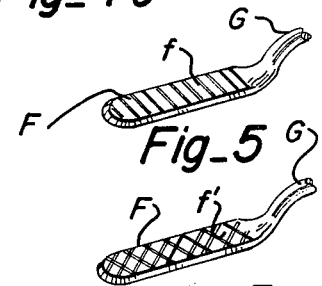
Fig_5
Fig_5a

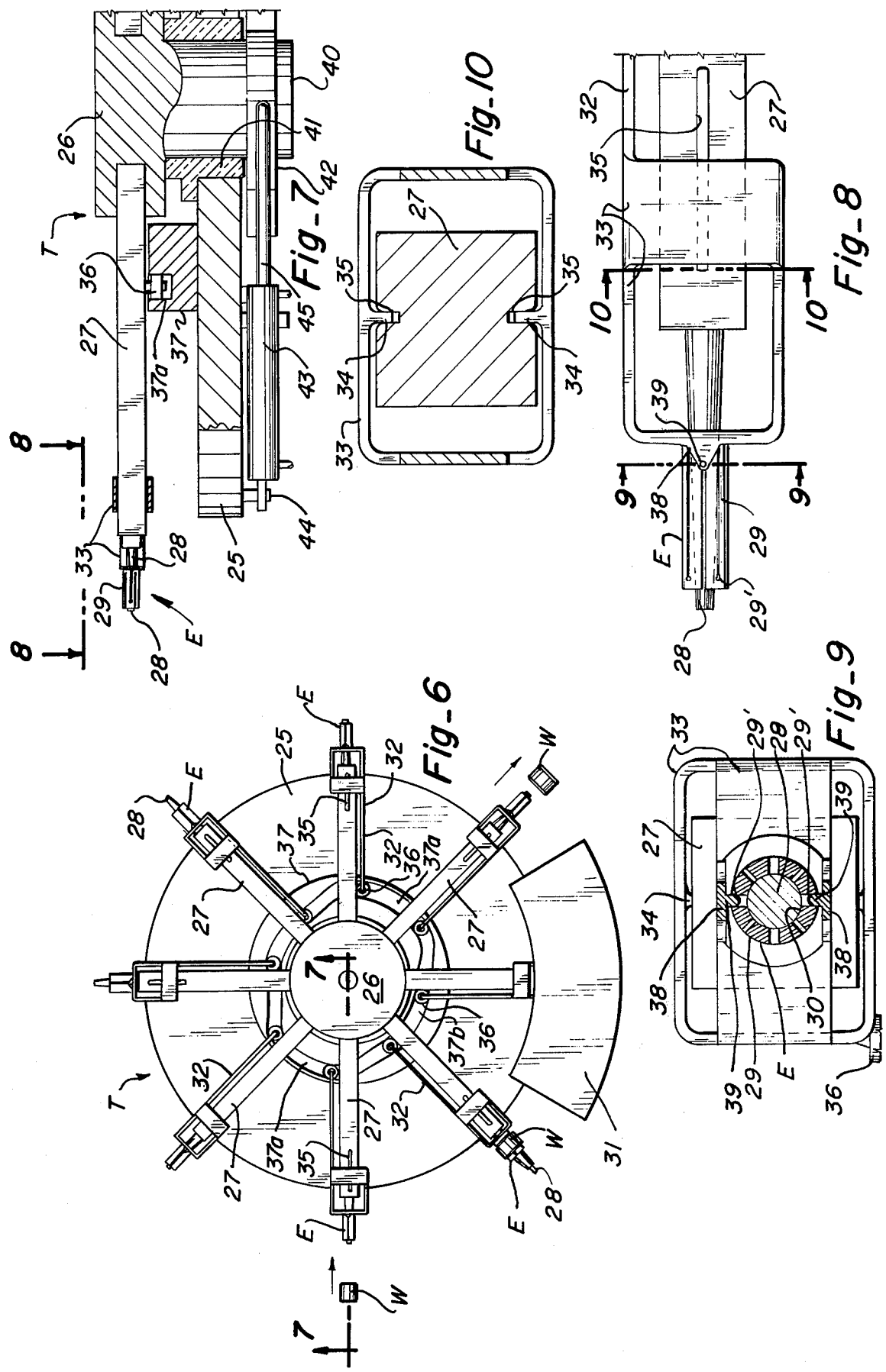

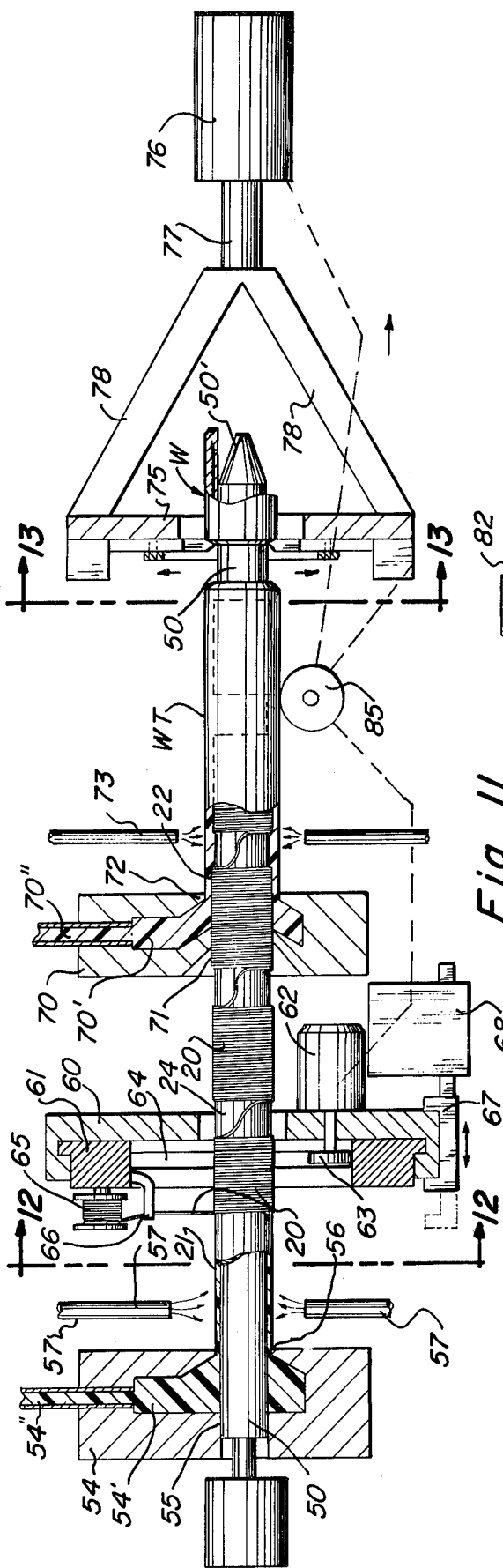
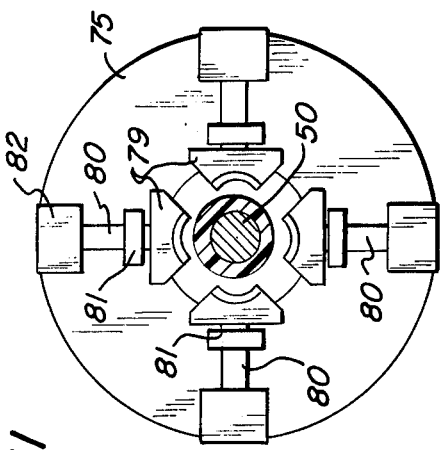
Fig_11
Fig_13
Fig_12

MANUFACTURE AND APPLICATION OF ROD WRAPS TO A FISHING ROD

This is a continuation, of application Ser. No. 516,034, filed Oct. 18. 1974, now abandoned.

The present invention relates to the wrapping of fishing rods, and more particularly to methods for forming and applying wraps to fishing rods.

Conventionally, a fishing rod is provided with line guides spaced along the reach of the rod and a line eye, the tip top, at the end of the rod to extend the line along the rod when it is in use. These line guides may be eyelets or simple wire loops having suitable opposing flattened ends, or feet, which lie against the rod and are held in place by wraps of thread about the rod. Such a wrap is usually formed by winding a nylon thread or other thread about the rod and upon the foot of a line guide with turns of the thread lying side by side in a neat appearing arrangement. The thread is held tight during the wrapping and the pressure of the resulting wrap tightly holds the line guide in place. After such a wrap has been wound upon a rod, it is covered by one or more protective coats of a high quality varnish, resin or lacquer. In addition to the rod wraps which hold the line guides in place, other short wraps may be spaced along the rod to reinforce its basic structure and to improve the appearance of the rod.

The wrapping of fishing rods is a manual operation requiring a high degree of skill and often it takes several years of experience before an operator can attain suitable skill and sufficient speed to be productive. Thus, these rod wrapping operations are expensive and amount to a substantial portion of the cost of the rod. With the present turbulent labor situation, a real problem exists in finding, training and hiring and keeping good wrappers. As a result, various expedients have been proposed to mechanize wrapping operations or to find a suitable substitute for such wraps. For example, it has been suggested that a plastic sleeve could be used as a substitute for a wrap and such a sleeve could be fitted upon a rod by heat shrinking so that it will attain sufficient tightness as to hold it in place. This desirable result has not been attained and it has been found that a sleeve of a type of plastic suitable for a shrink fit, which can be shrunk into place by heat, will not have sufficient strength to hold a line guide in place and will not grip the rod with sufficient tightness as to prevent it from slipping. A rod wrap must grip the rod and the foot of a guide so tightly that neither the wrap nor the foot under it will slip even when the rod is abused in a manner which could cause a non-too-tight wrap to slip.

A glueing of a rod wrap in place has been proposed but the materials forming a rod will not easily accept a glue, or adhesive, and again tight gripping of the rod is not attained. Moreover, it is desirable that a rod wrap have a slight degree of flexibility on the rod. Accordingly, most rods manufactured today are hand wrapped even though the operation is expensive, and labor problems limit the production of such rods.

The present invention was conceived and developed with the foregoing and other considerations in view and the invention comprises four facets: First, the invention includes a sleeve-like rod wrap. This wrap consists of a cylinder of a strong material, such as polyurethane, and preferably a wrapping of a selected thread embedded within the cylinder. With the wrapping encased in a tough resin coating of an elastomeric plastic, the problems which arise when the varnish of a conventional wrap commences to deteriorate are avoided. Secondly, the invention includes an improved and simplified method of applying such a sleeve-like wrap to a rod wherein the diameter of the wrap is increased as by stretching. The increased-diameter wrap is then treated or fixed such as by freezing, to remain in its expanded state after the expanding device is removed for at least a short period of time. The stretched wrap is then placed in position upon a rod, the final step being to return the wrap to its original size, as by returning it to ambient temperature, if the operation is freezing, to tightly grip the rod. Third, the invention includes an apparatus for effectively and rapidly performing a wrap-stretching operation using freezing to force the wraps to remain in their stretched state. Finally, the invention includes a continuous, rapid method and apparatus of forming sleeve-like wraps of wrapped thread embedded in a selected thermoplastic resin.

It follows that an object of the present invention is to provide a novel and improved sleeve-like wrap which may be fitted upon a rod to hold a line guide or the like, and which permits the feet of a line guide to be serrated or otherwise prepared for tighter gripping by the wrap.

Another object of the invention is to provide a novel and improved sleeve-like rod wrap which can be produced at a very low unit cost and which will significantly reduce the cost of production of fishing rods.

Another object of the invention is to provide a novel and improved sleeve-like rod wrap which is made of selected materials and is a high quality, strong product with an encapsulated thread rendering the same considerably more durable than the present hand wraps.

Another object of the invention is to provide a novel and improved method of affixing a sleeve-like rod wrap onto a fishing rod which involves simple, easily performed steps that result in an exceedingly tight fit of the wrap on the rod.

Another object of the invention is to provide a novel and improved apparatus for preparing a sleeve-like rod wrap for affixing the same onto a fishing rod.

Another object of the invention is to provide a sleeve-like wrap for a fishing rod formed as a cylinder of wound thread within a plastic embedment which eliminates conventional varnishing operations and is neat appearing, economical, strong, tough and capable of withstanding considerable abuse.

A further object of the invention is to provide a novel and improved operation and a sequence of operations for the manufacture of a sleeve-like wrap for a fishing rod which permits the same to be manufactured rapidly and at a minimum cost.

With the foregoing and other objects in view, the present invention comprises certain constructions, combinations and arrangements of parts and elements, and steps and sequences, all as hereinafter described, defined in the appended claims and illustrated in preferred embodiment in the accompanying drawing, in which:

FIG. 1 illustrates a fragment of a fishing rod with a line guide thereon being held by rod wraps constructed and applied in accordance with the principles of the invention.

FIG. 2 is a longitudinal sectional view of a preferred type of rod wrap constructed according to the invention but illustrated on a greatly enlarged scale.

FIG. 2a is a fragmentary sectional view similar to a portion of FIG. 2, but illustrating a modified mode of thread wrapping.

FIG. 3 is a longitudinal sectional view similar to the showing at FIG. 2, but illustrating a modified form of a rod wrap.

FIG. 4 is a diagrammatic sectional view of a rod wrap formed as a unitray member which may also represent wraps illustrative of a first step of a sequence of applying the wrap to a fishing rod in accordance with the invention.

FIG. 4a is a diagrammatic view similar to FIG. 4 but illustrating the expander as being expanded to enlarge the diameter of the rod wrap.

FIG. 4b is a diagrammatic view of the enlarged rod wrap of FIG. 4a after it has been frozen and with the expander removed.

FIG. 4c is a diagrammatic view of the enlarged, frozen rod wrap fitted upon a rod with the foot of a line guide being in place.

FIG. 4d is a diagrammatic view similar to FIG. 4c but after the rod wrap has warmed to ambient temperature and has shrunk upon the rod.

FIGS. 5 and 5a are enlarged fragmentary perspective views showing the foot of a line guide to be placed under a wrap, having a serrated surface thereon.

FIG. 6 is a plan view of an apparatus in the form of a turret capable of receiving, expanding, freezing and permitting the removal of frozen rod wraps in a sequential operation.

FIG. 7 is a fragmentary sectional view of the apparatus shown at FIG. 6, but on an enlarged scale.

FIG. 8 is a fragmentary plan view of a single expander unit on the apparatus, as taken from the indicated line 8—8 at FIG. 7.

FIG. 9 is a sectional view as taken from the indicated line 9—9 at FIG. 8, but on an enlarged scale.

FIG. 10 is a sectional view as taken from the indicated line 10—10 at FIG. 8.

FIG. 11 is a diagrammatic longitudinal sectional view exemplifying a production apparatus adapted to manufacture rod wraps upon a mandrel according to the principles of the invention.

FIG. 12 is a transverse sectional view as taken from the indicated line 12—12 at FIG. 11.

FIG. 13 is a transverse sectional view as taken from the indicated line 13—13 at FIG. 11.

Referring first to FIG. 1 of the drawing, a pair of the improved wraps W, sleeve-like members, are fitted upon a rod R to hold the opposing feet F of a line guide G. The general appearance of these wraps is conventional, and it is essential that they fit very tightly about the rod, with the foot portions F of the line guide being extended underneath each wrap, as illustrated. In the preferred embodiment of a wrap W, each wrap is formed as a tight winding of thread 20. Conventionally, the thread is wound directly upon the rod, and in the preferred embodiment, the thread is wrapped upon a thin inner sleeve 21. The thread 20 is also within an outer cover 22 so that the sleeve 21 and outer cover fully embed the thread. Preferably, this thread 20 is of nylon and the inner sleeve 21 and outer cover 22 are a clear polyurethane. The diameter of this wrap W, when it is first formed, will be estabilshed by the diameter of the rod R at the point where the wrap is to be placed and the inside diameter of a wrap W will be measurably less than the rod diameter at that point in order to produce a tight fit of the wrap upon the rod, as hereinafter described. Other proportions of the wrap, its thickness and length, may be varied. The wrap may be of any selected length and the thickness will depend upon the diameter of the thread and the amount of plastic used for the sleeve 21 and cover 22. While the wrap may be formed by winding a length of thread upon the inner sleeve 21, as a continuous wind about the sleeve, a wrap W' may also be formed by weaving thread upon the sleeve 21 as indicated at 20' at FIG. 2a. In either arrangement, a short reach of the plastic cover 22 extends beyond the wrapped thread at each end of the wrap to provide for a neatly finished edging 23, and also to better contain one or more ends 24 of the thread wrapping, as hereinafter further described.

Although a nylon thread 20 is preferred, other strong fiber materials of synthetic resin plastics can be used. The plastic materials 21 and 22 which embed this thread are preferably tough, thermoplastic types of polyurethane, such as the type known as Pellethane, manufactured by The Upjohn Co. of Kalamazoo, Michigan. Other strong, tough, plastic polymers such as styrene butadiene, and natural and synthetic rubbers may also be used. Other resins, which are used to form this wrap W, must have similar characteristics to nylon and polyurethane, in that such materials must have sufficient resilience as to permit them to be stretched, and they must be capable of being fixed while in a stretched state at least for a short period of time. It is believed that the stretching action may be either a resilient, an elastomeric, or a plastic-memory phenomenon of a type commonly observed in many synthetic resins. The basic feature of the stretching action herein considered resides in the fact that the resin may be stretched, or expanded, and then remain in a stretched, or expanded, state for a short time period before recovery, that is, before returning to, or approximately to, the initial unstretched state. This may be accomplished with some materials by softening them with volatile solvents, such as, for example, polyurethane can be softened and expanded with methylene chloride. This may also be accomplished by holding the material stretched for an extended time period or, more quickly, by lowering the temperature of the material by chilling below ambient temperature and in some cases, to cryogenic temperature. This latter operation, which constitutes the preferred mode according to the present invention, will be hereinafter referred to as "freezing". When so frozen, the plastic resins suitable for the purpose at hand will return to their original state once the materials are warmed to ambient temperature, an operation which will be hereinafter referred to as "warming".

A rod wrap may be formed without the use of thread. As exemplified at FIG. 3, a modified wrap W'' includes an inner, cylindrical sleeve 20'' of a strong plastic material, such as nylon, or a hard, high-tensile strength polyurethane, which is suitably encased within a plastic, outer cover 22'' of a clear, tough, wear-resistant material, such as polyurethane or other elastomers. The modified wrap W'' is also formed with a short portion of the cover 22'' extending beyond each end of the sleeve 20'' as an edging 23'' to improve the appearance of the unit. Also, if the cover 22'' is transparent, the sleeve 20'' may be of a selected color and surface texture to provide for a distinctive unit. A further modified, simplified wrap, not shown, is where the wrap is a cylindrical sleeve of a single material. A strong, tough polyurethane such as pellethane 2103–90a manufactured by the Upjohn Company of Kalamazoo, Mich., may be used for this purpose, although the quality and appearance of this simplified, one-piece wrap will not be as good as that of the wrap W.

Such unitray or two-piece, or even the threaded wraps, may be formed by several processes such as by extrusion or by injection molding processes. The rod wrap may also be formed without the inner sleeve 21 by coating the thread with an elastomeric plastic such as polyurethane, and the wraps of the thread may then be fused together, either before or when the outer cover 22 is applied by extrusion or in any other manner, such as by injection molding or spraying. Also, in injection molding, the pressure may be such as to force the plastic forming the outer cover 22 into and through the interstices of the thread fibers. In either case, the fusion operation of the coating on the adjacent wraps or high pressure injection molding will form the equivalent of the inner sleeve 21, if such a sleeve is not provided in advance of forming the cover 22.

It is essential that the wraps W and W' be fitted upon a fishing rod with an exceedingly tight fit which is comparable to that which can be attained when a thread is wrapped about a rod in a conventional manner. In accordance with the preferred mode of practicing the present invention, to attain this very tight fit, the wrap W is forcibly expanded to a size greater than the diameter of the fishing rod at the point where the wrap is to be placed. Once expanded, the wrap is frozen and to a temperature where it will not immediately return to its initial size although it will do so when warmed to ambient temperature. The freezing temperature will depend upon the plastic materials forming the wrap and a suitable low temperature for a give resin can be easily determined by simple experiments. For example, with the nylon thread and polyurethane cover, a temperature of approximately 10° F was found to be sufficient. Cryogenic temperatures (as might be obtained by using liquid nitrogen) may be preferable to extend the time before the wrap warms.

Thereafter, the frozen wrap is fitted upon the fishing rod, with the foot of a guide being placed underneath it at a proper position. The wrap is then allowed to warm to ambient temperature. Responsive to this warming, the wrap regains its natural elasticity to contract to its original size, or nearly so, and to grip the rod and a line guide foot F with an exceedingly tight fit, for the initial size of the wrap will be somewhat less than the diameter of the rod at the point where the wrap is to be placed, as heretofore mentioned.

This sequence of operations is diagrammatically illustrated at FIGS. 4, 4a, 4b, 4c and 4d. The expansion of the wrap W to an increased diameter may be accomplished with any suitable tool, and a conventional expander E may be used for this purpose. The expander E, as illustrated, is a simple cylindrical tube having a circumferential array of longitudinal slots 29 in the walls, each of which commences at a hole 29' near one end of the tube and terminates at the opposite end of the tube, and with the slots being oppositely directed from adjacent slots in an alternating manner as illustrated in the figure. The passageway through the tube is a tapered core 30 extending through the expander E. When a taper pin, not shown at FIGS. 4 and 4a, which corresponds to the tapered core 30 of the expander, is driven into the expander the slots will spread apart, as illustrated at FIG. 4a, to increase the diameter of the wrap W. The wrap, the expander and the pin may then be subjected to a reduced temperature to freeze the wrap. When the wrap is frozen, the pin may be removed from the expander E to permit it to contract and then be removed from the wrap to leave a frozen, expanded wrap W as shown at FIG. 4b. Thereafter, the frozen wrap W is placed upon a fishing rod R with the foot F of a guide G in place, as shown at FIG. 4c. As the wrap warms, it reduces in size to tightly grip the rod and foot as shown at FIG. 4d. For a better fit and a tighter gripping of the foot by the wrap, the upper surface of a foot may be corrugated as shown at f at FIG. 5 or even knurled as at f' as shown at FIG. 5a. Such corrugations are not possible with conventional wraps because they will cut the threads of the wrap; accordingly a much better gripping by this improved wrap with a corrugated foot is possible.

It was discovered that when the specified polyurethane resin forming the inner sleeve 21 and outer cover 22 would freeze at approximately 10° F., the nylon threads would also remain in the expanded state, as shown at FIG. 4b. It was further discovered that the time period between stretching and freezing must be of comparatively short duration, less than two hours, if the wrap is to return to a size very close to its initial size after freezing and warming. However, the frozen wrap may be stored for a substantial time period and will return to or nearly to, its initial size upon thawing. Such variations do not affect the essential features of the invention, since it is contemplated that the operations will be prompt and that a wrap W will be fitted upon a rod as soon as it is frozen. However, the storage of frozen wraps is possible and at times may be advantageous.

Once a wrap W, W' or W'' is placed upon a fishing rod R and allowed to warm, it will shrink and grip the rod tightly. However, to attain an even tighter grip upon the rod, the rod can be placed in an oven and heated to a temperature approximating 300° F. to cause a further shrinking action and gripping of the rod.

FIGS. 6 – 10 illustrate an apparatus capable of quickly freezing a large number of wraps W in sequence where they are to be fitted onto fishing rods as a step in the production of the rods. This apparatus is essentially a turret T which is mounted upon a table 24 and having its axial head 26 at the center of the table. The turret is formed with a plurality of arms 27, each carrying a device to expand wraps such as the expander E heretofore described.

In fitting wraps upon a rod to hold line guides G, it is necessary to provide different size wraps at different positions along the reach of the rod because of the tapered contruction of a fishing rod. Thus, different size expanders E are needed to correspond with the several wraps. A turret type of expanding and freezing apparatus, as shown at FIGS. 6 to 10, is especially useful in this regard because it may be used for expanding and freezing wraps of the same size, or it may be used for expanding and freezing wraps of different sizes.

Each arm 27 extends radially from the turret head to carry a taper pin 28 at its outstanding end in axial alignment with the arm 27. Each taper pin 28 fits within a core 30 of a slotted expander E, such as heretofore described, and movement of this expander E upon the taper pin 28 will enlarge or reduce the expander. In the construction shown, the taper pins are placed such that outward movement of the expander, with respect to the axial head of the turret, reduces the diameter of the expander E and inward movement increases its diameter. This arrangement may also be varied in other ways, for example, an expander E may be mounted upon an arm 27 while the taper pin 28 moves back and forth, such an arrangement being fully equivalent to that illustrated and described. In any case, the movement of the moving member, such as the movement of the expander E as illustrated, is conveniently associated with the rotation of the turret about its axis to permit the expanders to be at a minimum size at a loading station where wraps W are placed upon the expanders, to thereafter enlarge the expanders and move them through a freezer 31 at one side of the turret, and to thereafter again reduce in size to permit the frozen wraps to be removed from them.

A suitable mechanism is provided for shifting each expander E upon its taper pin 28 which includes a shift arm 32 mounted alongside the arm 27. The extended end of this shift arm 32 is formed as a box-like collar 33 connected to the expander E and having stabilizer guides 34 fitted in slots 35 in the turret arm 27 to restrict its movement to axial movement with respect to the arm and the taper pin 28 at the extended end of the arm.

This shift arm 32 extends radially toward the center of the turret to carry a follower wheel 36 in the slot of a circular cam 37 mounted upon the table 25 about the turret head 26. The slot in this cam 37, wherein the wheel 36 rides, includes outward reaches 37a which extend the shift arms 32 to reduce the size of the expanders. Inward reaches 37b retract the shift arms 32 to increase the size of the expanders E, with the sequence being arranged to position the cam slot reaches 37a at the stations about the turret T whereon wraps W are mounted and removed, and the other cam slot reach 37b is located at the stations where the wraps W are expanded and pass through the freezer 31.

Each expander E may be connected to its collar 33 in any suitable manner, and where a slotted expander E is used, a yoke 38 may be formed on the end of the collar with pins 39 extending into opposing slot holes 29' of the expander, as illustrated at FIG. 9, and this pin fit is in a loose arrangement which permits the necessary expansion of the expander E.

The freezer 31 may be of any conventional type which need not be described herein. Also, freezing may be accomplished with liquid nitrogen contacting the wraps as they enter the freezer 31. The use of a cold refrigerant may be necessary for it may be desirable to freeze the wraps to a selected temperature as rapidly as possible whenever this operation controls the speed of the assembly cycles of fitting the wraps upon rods.

The rotary movement of the turret T may be controlled in any conventional arrangement. In the arrangement illustrated, the turret T is carried upon a shaft 40 which extends below the head of the turret and into a bearing 41 at the center of the table 25. This turret may be driven by a mechanism to move it either continuously or intermittently. For intermittent movement, a ratchet wheel 42 may be mounted at the lower extended portion of the shaft 30, and a ratchet drive cylinder 43 may be mounted upon a pivot 44 underneath the table to swing back and forth as the piston rod 45 of the drive cylinder engages the ratchet teeth to rotate the turret one step at a time. A biasing spring and other controls for this ratchet drive are not shown since such are conventional and may be arranged to operate the turret in any desired manner.

FIGS. 11 – 13 illustrate in a somewhat diagrammatic manner the essential components of an apparatus for manufacturing the wound wraps W exemplified at FIG. 2. Large numbers of wound wraps must be provided for a rod wrapping operation and it is essential that these wraps be manufactured in a continuous manner where the time interval required to manufacture each wrap is comparatively short. Accordingly, the apparatus illustrated at FIGS. 11 – 13 contemplates forming these wraps W as a continuous extrusion upon a cylindrical mandrel 50 with the components of the wraps W being sequentially formed upon the mandrel to produce a continuous wrap tube WT which moves along the mandrel and from which individual wraps are cut at the end of the tube WT. Also, as the wrap tube WT is formed, the diameter of the mandrel may be reduced at critical locations where there is a tendency for the wrap tube to resist movement along the reach of the mandrel. It is contemplated that the mandrel can carry coolants for cooling the wrap tube and an air supply to provide an air cushion between the wall of the mandrel and the tube. The arrangements of these features to facilitate the movement of the wrap tube WT upon the mandrel can be best determined by test runs of the apparatus.

The first step of the operation is to form the inner sleeve 21 as by an extruder die 54 at the base end of the mandrel. This end of the mandrel is held within the body of the extruder die 54 as in a socket 55 so that the circular lip 56 of the extruder die will be positioned concentrically about the mandrel. The extruder die 54 is illustrated as a simple block having a cavity 54' therethrough the mandrel extends and a resin feed tube 54'' extends from a suitable supply through the block to the cavity. The construction of this die and resin feeding arrangement need not be described in detail since the same is essentially conventional. In operation, a thin-walled tube of resin is to be extruded from the lip 56 about the mandrel. It is essential that this tube 21 of resin be promptly cooled so that it will attain sufficient rigidity to maintain its form during its movement along the mandrel. In this connection, that portion of the mandrel within the die cavity and immediately beyond the die cavity may also be cooled if such is found to be necessary. Also, the diameter of the mandrel may be reduced immediately beyond the die and a coolant may be applied both at the inside and outside surfaces of the tube to quickly rigidify it. The cooling operation is essentially conventional and is diagrammatically illustrated herein as by fluid coolant jets directed against the tube 21 as through feed pipes 57. If desired, the cooling may be accomplished with the use of liquid nitrogen or other cryogenic agent so that the action will be very rapid and will produce a comparatively rigid, inner tube 21. Such rigidity may be necessary to permit driving mechanisms to drive the tube, and to prevent compression of the tube during subsequent winding operations.

This thinwalled tube 21 moves to a winding station comprising a circular base 60 which embraces the mandrel 50. The base 60 carries a spinner ring 61. This ring rotates within the base 60 by a small drive motor 62, the motor shaft including a gear 63 engaging an internal gear 64 in the spinner ring. The spinner ring carries a bobbin 65 with thread 20 extending therefrom and to the tube 21 on the mandrel. A guide finger 66 on the spinner facilitates keeping the thread in alignment with respect to the mandrel as it is payed from the bobbin 65.

It is essential that this thread winding apparatus, or at least a portion of this apparatus, shift with respect to the movement of the tube 21 to provide a neat appearing winding of the thread 20, with each turn of the thread lying snugly against the adjacent threads in a neat appearing manner. This necessitates timing the movement of the apparatus with the movement of the tube 21 along the mandrel. Also, when sufficient thread is wound to complete a single wrap W, it is necessary to skip a space before commencing to wind the next wrap W with the thread extending directly across the skipped portion to form the tag ends 24 heretofore described. In the construction illustrated, this is accomplished by a shifting carrier 67 which supports the base 60 and which is adapted to shift the base 60 first in a direction the same as the tube movement, at a slow, uniform rate and then, when a wrap is completed, suddenly shifting in the opposite direction whereby to produce the space where the tag ends 24 appear. The spacing between wraps produced by the reverse shifting of the base 60 is such as to form two edging portions 23 when the individual wraps are severed from the wrap tube WT. The shifting carrier 67 is actuated by a control shifter 68, of any conventional arrangement, which will slowly move the carrier 67 in one direction and then suddenly reverse movement to repeat the cycle and this control shifter is coordinated with the rotation of the drive motor 62 and other components as hereinafter described.

Once thread in wound upon the wrap tube WT, the outer cover tube 22 is applied. As a preliminary step to applying this cover, the temperature of the inner tube 21 and the temperature of the wrap may be elevated to get good adhesion between the thread and the outer cover tube 22 and the inner tube and the outer cover tube 22 at the margin spacings 23 and between the individual wraps. This cover 22 is also applied by an extruding operation, as by an extruder die 70. The die 70 includes a cavity 70' and a feeder tube 70'' in any conventional arrangement, and the mandrel 50 and wrap tube WT extend through this die. An entrance orifice 71 is located at the face of the die 70 whereinto the wrap tube moves, and this orifice is of a diameter which produces a close fit with the threads 20 of a wrap to prevent a backflow of resin from the cavity 70'. A larger exit orifice 72 is located at the opposite face of the die 70 wherefrom a finished wrap tube WT moves with a cover 22 of a selected thickness being extruded over the thread wraps 20. It is desirable that this finished wrap tube WT again be cooled as soon as it moves away from the die 70 so that it will maintain its rigidity as it continues to move along the mandrel and such cooling may be accomplished by a coolant directed against the outer surface of the tube and also, if necessary, against the inner surface of the tube. This is diagrammatically illustrated by a flow of coolant from feed pipes 73.

The continued movement of the wrap tube along the mandrel 50 moves the wrap tube to a cut-off station where individual wraps W are severed from the tube and removed from the mandrel. Various mechanisms may be provided to effect this cut-off action and the mechanism illustrated at FIGS. 11 and 13 consists of a disc-shaped head 75 which is positioned transversely to the axis of the mandrel 50 with the mandrel extending through the center orifice of the head 75. This head 75 is mounted upon suitable guides, not shown, to shift longitudinally with respect to the mandrel from a first position where a wrap W may be severed from the wrap tube to a second position where the severed wrap W' is removed from the mandrel. This longitudinal movement is produced by a shifting actuator 76 mounted in axial alignment with the mandrel. The shifting rod 77 of the actuator carries arms 78 to hold the head 75 in place.

The head 75 carries a circular array of cut-off knives 79, each of which is mounted upon a radial actuator arm 80 which, in turn, is slidably held in a guide 81 affixed to the head 75. Thrustor actuators 82 control the arms 80 to move the knives 79 inwardly and against the mandrel 51 and at this position, the knives snugly fit together and embrace the mandrel. The edges of the knives are suitably bevelled to produce a bevelled cut when a wrap W is severed from a wrap tube to thereby form a neat appearing end. By providing a mandrel of hardened steel, a comparatively sharp set of knives 79, also hardened steel, may be thrust directly against the mandrel 50 to completely sever the wrap tube thereon. It follows that whenever the shifting rod 77 extends over the wrap tube to a selected cut-off point, the knives 79 are moved to the mandrel to sever a wrap. During the severing operation, the knives must move with the tube. After severing, they move faster and this return movement of the shifting rod 77 pulls the wrap W off the mandrel. The end 50' of the mandrel may be tapered in any suitable manner such as that illustrated to facilitate the removal of the wraps as they are severed from the wrap tube.

Other mechanisms can be used to sever a wrap from the wrap tube. For example, rotary knives or spinning abrasive discs may be carried upon a disc 75 in a manner which causes them to be drive about the wrap tube to form a neat appearing, bevelled cut. If necessary, the wrap tube may be frozen at this point to facilitate the cutting operation.

All of the operations heretofore described must be indexed to sever a wrap W from the wrap tube WT at that section which lies between individual wraps of thread 20 so that end of each wrap is formed with a finished edging 23. The indexing of operations and sequences such as that above described, involves techniques well known in the art and basically, the indexing operation may include an indexing wheel 85, or the like, which rolls against the surface of the wrap tube to record its progress along the mandrel. Through suitable electrical or mechanical means, this index wheel is associated with the thread wrapping drive motor 62, the sifting carrier shifter 68, the cut-off actuator 76 and the knife actuators 82, all to provide for a smooth, continuous, wrap-forming operation as described. The timing of these operations with the movement of the tube may be computer synchronized.

The movement of the wrap tube WT along the mandrel is the critical movement and other operations must be synchronized with this movement. This tube movement may be effected by various types of driving mechanisms such as drive drive wheels or belts contacting the tube surface at selected locations. The movement may also be facilitated by reciprocating or vibrating the mandrel and if this is done, the surface of the mandrel may be finished to facilitate the forward movements.

While I have now described my invention is considerable detail, it is obvious that other constructions exist which are fully equivalent to those which I have described. For example, I have herein described an expander E which operates mechanically, by the use of a taper pin 28 which fits within a core 30 of the expander. Other expanders are available which perform the same function insofar as my invention is concerned, which can operate by hydraulic or pneumatic mechanisms. Since others skilled in the art can build alternate and equivalent constructions and devise equivalent operations and sequences of steps, I desire that my protection be limited not by the details herein described, but only by the proper scope of the appended claims.

I claim:

1. A fastening method for securely attaching a line guide or other relatively rigid fishing rod implement to a flexible fishing rod with a sleeve-like rod wrap having an inside diameter at normal room temperature less than the diameter of the rod and being formed of a strong, tough resilient polymer material having characteristics similar to nylon which exhibits the properties of being capable of being elastically stretched at normal room temperature, fixed in its stretched state by lowering the temperature thereof below normal room temperature whereby the elasticity is temporarily lost, and subsequently returned towards its original unstretched state by being allowed to warm toward normal room temperature without requiring the application of additional heat thereto such that the elasticity thereof is regained, said fastening method comprising the steps of: radially expanding the rod wrap and elastically stretching same to increase its inside diameter to a diameter greater than the diameter of the rod;

lowering the temperature of the expanded rod wrap sufficiently to cause the rod wrap to lose its elasticity and remain in a fixed and expanded state by applying a cooling medium to the expanded wrap;

thereafter removing the cooling medium and, before the rod wrap warms sufficiently to regain its elasticity, physically placing the rod wrap about the rod and at least a portion of the rod implement to be attached thereto, whereby the rod wrap, as it warms toward normal room temperature and regains elasticity, will contract and tightly grip the rod and the rod implement in a tensioned conditions to secure the rod implement to the rod.

2. A fastening method as defined in claim 1 wherein the rod wrap is formed of nylon.

3. A fastening method as defined in claim 2, wherein the temperature of the rod wrap is lowered to cryogenic temperatures.

* * * * *